United States Patent Office 3,337,611
Patented Aug. 22, 1967

3,337,611
SYNTHESIS OF VINYL ESTERS BY ESTER INTERCHANGE WITH A MOLAR EXCESS OF THE CARBOXYLIC ACID
Roby Bearden, Jr., Baton Rouge, La., assignor to Esso Research and Engineering Company, a corporation of Delaware
No Drawing. Filed Apr. 12, 1965, Ser. No. 447,556
3 Claims. (Cl. 260—491)

The present invention relates to vinyl esters and to a process for the preparation of such esters. In particular, it relates to an improved process for production of vinyl esters via interchange reactions between vinyl esters and carboxylic acids.

Vinyl esters, e.g., vinyl pivalate, vinyl heptanoate, vinyl decanoate, and vinyl tridecanoate, are useful as additives for soaps, synthetic resins and rubbers to inhibit drying. The branched chain esters are in general more stable than the normal straight chain esters.

Certain of such esters, e.g., vinyl pivalate are useful as monomers or co-monomers for polymerization leading to valuable resins, drying oils, and surface coating materials.

Vinyl esters have been prepared by interchange reactions, in the presence of suitable catalysts, between carboxylic acids and vinyl esters to form vinyl esters which differ from the starting ester. In such reactions, there is a substitution and exchange of moieties between the starting compounds or reactants, the hydrogen of the carboxyl group of the acid being substituted by the vinyl group of the starting ester and, conversely, the vinyl group of the ester being substituted by the hydrogen of the carboxylic acid. Thus, e.g., vinyl acetate can be reacted with butyric acid to effect an interchange reaction wherein the hydrogen moiety of the butyric acid molecule is exchanged for the vinyl moiety of the vinyl acetate to give rise to a new vinyl ester, i.e., vinyl butyrate.

In such reactions it is conventional practice to employ an excess of the initial vinyl ester, usually vinyl acetate, reactant in relation to the amount of carboxylic acid employed. This drives the reaction to completion in accord with the law of mass action. Thus, it is stressed in prior art practice to provide molar excesses of the vinyl ester reactant. Often, also, relatively high temperatures are employed to improve the rate of conversion. These combinations of conditions have led to extensive formation of diesters, particularly ethylidene diesters, in side reactions.

To obtain an efficient interchange, generally, at least about 3 or 4 moles of the initial vinyl ester are employed per mole of the carboxylic acid reactant. In fact, the proportion most ordinarily employed is about 6 moles of the vinyl ester reactant per mole of the carboxylic acid reactant. Traditionally, even under the best of circumstances, the yield of the product vinyl esters has been low.

Another difficulty associated with the vinyl interchange process is due to the serious process difficulties of separating large quantities of the starting vinyl ester from the product. Conventional separation techniques have called for distillation to separate the vinyl esters and unreacted carboxylic acid. In such distillations, partial decomposition occurs, particularly in the presence of catalysts, e.g., catalysts such as mercury salts, this resulting in high losses of the desirable vinyl ester product, as well as loss of the starting materials. Polymerizations occur, particularly in prolonged distillations. This is particularly true in the present type of separation involving the distillation of mixtures of close boiling materials. Losses of the vinyl product ester, especially the high boiling esters, are intensified. Further, the mixtures of close boiling materials are difficult to separate.

It is, however, the primary objective of the present invention to overcome the foregoing and other difficulties and to provide the art with a new and improved method for producing vinyl esters via ester interchange reactions. In particular, it is an object to provide an improved process for producing vinyl esters in greater yield and with less production losses than heretofore believed possible. More particularly, it is an object to provide an improved process by which the product vinyl esters, particularly branched chain esters, or neo-esters, can be recovered from the mixtures in relatively purified condition. A further specific object is to provide such process which makes possible faster rates of reaction and higher yields of product ester.

These objects and others are achieved in accordance with the present invention which contemplates contacting together a molar excess of a carboxylic acid and a vinyl ester in the presence of a suitable catalyst at sufficient temperature to produce an ester interchange reaction. Preferably, the carboxylic acid, the reactant supplied in molar excess, is one containing from two to about 30 carbon atoms, and more preferably from about 5 to about 20 carbon atoms. On the other hand, the ester reactant is preferably one containing from 4 to about 10 carbon atoms, and more preferably from 4 to about 6 carbon atoms. For best results, the reaction is conducted at temperatures ranging from about $-25°$ C. to about $100°$ C. and more preferably from about $0°$ C. to about $50°$ C. and in the presence of mercury salt catalysts.

A key and novel feature of the invention resides in the use of molar excesses of carboxylic acid in relation to the amount of vinyl ester reactant. In general, it is desirable to employ at least about 2 moles of carboxylic acid per mole of vinyl ester reactant, and more preferably from 2 moles to about 4 moles of the carboxylic acid per mole of the vinyl ester reactant. In accordance therewith, it has been found that various desirable vinyl esters are synthesized in good yield via the resulting interchange reaction. The hydrogen atom is cleaved from the carboxyl group of the acid and readily substituted by the vinyl group of the starting ester and, conversely, the vinyl group cleaved from the ester is readily substituted by the hydrogen from the carboxyl group of the carboxylic acid. Surprisingly, however, this reaction takes place at a faster rate and the conversion of the reactants to the new and desirable vinyl ester is more complete than will occur where only equal molar quantities of the reactants are employed, or where the vinyl ester reactant is provided in excess such as stressed by the prior art, supra. Moreover, the desirable product ester is readily recovered in good yield even by simple distillation techniques, and without excessive deterioration or polymerization, or both.

The instant process has special applicability to the formation of vinyl esters from branched-chain carboxylic acids as contrasted with those formed from straight chain carboxylic acids. Branched-chain, e.g., neo-acids, have been found particularly suitable for such synthesis and the resultant vinyl ester derivatives outstanding for many uses. Conversion of the reactant neo-acids to the desirable vinyl ester is very rapid and conversions are significantly high as contrasted with conversion obtained from straight chain carboxylic acids. Also, yields are high and losses from by-product formation, deterioration, destruction and polymerization relatively low.

Thus, in past processes, yields of a desired ester have rarely, if ever, much exceeded 50 to 60 mole percent, based on the carboxylic acid reactant. This is sharply contrasted with the present invention wherein, e.g., in the reaction between pivalic acid vinyl and vinyl acetate at a modest 2:1 molar excess of acid to ester, and at a reaction time of only 3 hours at ambient temperature—viz., 25–30° C.—a yield of 70–80 percent vinyl pivalate is obtained. Moreover, by increasing the acid:vinyl ester reactant ratio to 3:1, a yield in excess of 90 percent is obtained. This is in striking contract with runs wherein a molar excess of reactant ester is provided relative to carboxylic acid, even where ideal conditions are employed. In fact, even when employing a neo-acid under such conditions, the conversion rate is low. For example, even in a reaction involving identical reactants, i.e., pivalic acid and vinyl acetate, e.g., where the latter is employed in molar ratio of 6:1 relative to the acid, 72 or more hours are required to provide even a 62 percent conversion. Where higher temperatures are employed to achieve a faster rate of reaction, yields are even further reduced and by-product formation, especially diester formation, becomes acute.

While applicant does not desire to be bound by any theory of mechanism and can offer at best only a partial explanation, it is believed that at least in the situation of the neo-acid, the branching sterically influences the equilibrium to favor formation of the vinyl ester of the neo-acid. Whether this steric influence serves to discourage attack by, e.g., mercury salt catalyst, on the ester either by a shielding action or by disruption of electronic configuration is not known with certainty.

Mono basic carboxylic acids are preferably employed in the practice of this invention. Preferably, the acids should contain some degree of branching. Neo-acids, i.e., the alpha alpha disubstituted, carboxylic acids, are particularly preferred. The moieties attached to the carboxylic acid molecules at the alpha alpha—viz., $\alpha,\alpha$—positions can be alkyl, aryl, aryl alkyl, alkyl aryl, and the like. These moieties can be substituted or unsubstituted, branched or unbranched. Alkyls or aryls containing up to six carbon atoms are most preferred and the substituted group or moiety can be the same or different, but is generally the same. Exemplary of such substituents are methyl, ethyl, isopropyl, amyl, phenyl, or the like. Compounds containing from 2 to about 25 carbon atoms, and more preferably from about 5 to about 20 carbon atoms in the total molecule are preferred. Compounds containing unsubstituted hydrocarbon groups have been found particularly satisfactory. Thus, e.g., the reaction can be carried out most advantageously with mono aliphatic carboxylic acids, such as neo-pentanoic (pivalic) acid, neo-heptanoic acid, neo-decanoic acid, neo-tridecanoic acid, neo-palmitoic acid, neo-nonadecanoic acid, neo-heneicosanoic acid, and the like. Polybasic carboxylic acids are suitable in certain instances in the practice of the present invention. Exemplary of such poly carboxylic acids are succinic acid, adipic acid, pimelic acid, malonic acid, and the like; particularly the alkyl substituted members of these acids, especially the $\alpha,\alpha$-disubstituted series (neo structure).

Vinyl esters suitable in the practice of the present invention include vinyl propionate, vinyl butyrate, vinyl valerate, vinyl hexanoate, vinyl heptanoate, and the like.

Vinyl acetate is particularly suitable as a vinyl acid reactant because it is especially effective, particularly from the cost-effectiveness standpoint, it readily available, and particularly effective in producing high yields.

The following non-limiting examples and pertinent demonstrations bring out the more salient features and provide a better understanding of the invention.

*Example 1*

To a stirred glass-lined reaction vessel, blanketed with an atmosphere of nitrogen, is charged 2 pound moles of butyric acid at ambient temperature. To the butyric acid is then added 1 pound mole of vinyl acetate and 0.011 pound mole of mercuric acetate. 0.009 pound mole of 100 percent sulfuric acid is then added and the reaction allowed to proceed for 3 hours at 25° C. At the end of this period the reaction is terminated by the addition of sodium acetate trihydrate.

Analysis of the reaction products, after simple distillation, shows that 60 percent, based on the moles of vinyl acetate reactant originally charged, is converted to vinyl butyrate.

*Example 2*

A glass-lined reaction vessel equipped with a stirrer is purged with nitrogen and then charged with 2 pound moles of neo-pentanoic acid (pivalic acid). To the contents of the vessel is then added 1 pound mole of vinyl acetate. Then, 0.013 pound mole of mercuric acetate and 0.01 pound mole of 100 percent sulfuric acid are charged into the vessel. The reaction is terminated by addition of sodium acetate trihydrate at the end of a 3-hour period.

Analysis of the reaction product mixture after distillation shows that 65 percent of vinyl acetate originally present is converted to vinyl pivalate.

*Example 3*

To a stirred glass-lined reaction vessel previously purged with nitrogen and provided with a blanketing nitrogen atmosphere is first charged 1.5 pound moles of neo-decanoic acid. Into the reactor is then charged 0.75 pound mole of vinyl acetate, 0.016 pound mole of mercuric acetate, and 0.013 pound mole of sulfuric acid. The reaction is allowed to proceed at 25° C. for nearly 3 hours, at the end of which time the reaction is terminated by addition of an excess of sodium acetate trihydrate.

Analysis of the reaction product mixture shows that 80 percent of the vinyl acetate reactant is converted to vinyl neo-decanoate.

The foregoing data are sharply contrasted with results obtained by providing a molar excess of vinyl ester to carboxylic acid. In such instances, conversions, based on the moles of the limiting reactant, i.e., the acid, are only on the order of 65 to about 80 percent of the values obtained where the limiting reactant is the ester. Greater and more rapid conversions can also be obtained where the carboxylic acids are sterically hindered. Thus, reference to Examples 1–3 shows increased conversions with the use of the branched carboxylic acids. Thus, in each instance the molar ratio of acid:ester reactant is 2:1 and temperature and reaction conditions are substantially the same. It is thus apparent that the branched or neo-structure provides greater conversion even under otherwise identical conditions. Moreover, process advantages are obtained. Thus, e.g., there is less necessity to handle uninhibited vinyl acetate which is potentially dangerous due to possibly explosive autopolymerizations with air. Further, equipment requirements are lessened. Yet further, high temperatures are not necessary due to the more rapid conversions at low temperature, and there is no lareg amount of vinyl ester to be fractionated from the reaction mixture. The unreacted carboxylic acids can be readily recovered and used. Standard recovery procedures can also be used because, inter alia, of the shorter reaction time and the lesser quantities of chemicals to be removed by fractionation. Also, there are lesser amounts of higher boiling reactant to be removed by distillation.

Numerous changes can be made in the present method without departing from the spirit and scope of the invention.

Having described the invention, what is claimed is:

1. In a process wherein vinyl esters are prepared via an interchange reaction between a vinyl ester reactant having from 4 to about 10 carbon atoms and a carboxylic acid reactant having from 2 to about 30 carbon atoms in the presence of a mercury salt catalyst at a temperature of from about −25° C. to about 100° C. to produce the interchange reaction to give rise to a new and different vinyl ester product, the improvement comprising providing a molar excess of the carboxylic acid relative to the molar concentration of the vinyl ester reactant of from about 2:1 to about 4:1.

2. The process of claim 1 wherein the vinyl ester reactant is vinyl acetate.

3. A process for the manufacture of vinyl pivalate by contacting together pivalic acid and vinyl acetate in the presence of catalytic amounts of mercuric sulfate at temperatures ranging from about 0° C. to about 40° C., said pivalic acid reactant being provided in molar excess ranging from about 2:1 to about 4:1 based on the pivalic acid:vinyl acetate ratio.

References Cited

UNITED STATES PATENTS

| 1,882,808 | 10/1932 | Graves | 260—491 |
| 2,162,451 | 6/1939 | Ropp | 260—491 |
| 2,299,862 | 10/1942 | Toussaint | 260—491 |

LORRAINE A. WEINBERGER, *Primary Examiner.*

VIVIAN GARNER, *Assistant Examiner.*